US011946701B2

(12) United States Patent
Saviers et al.

(10) Patent No.: US 11,946,701 B2
(45) Date of Patent: Apr. 2, 2024

(54) HEAT TRANSFER SYSTEMS

(71) Applicant: B/E Aerospace, Inc., Winston-Salem, NC (US)

(72) Inventors: Kimberly Rae Saviers, Glastonbury, CT (US); Matthew Robert Pearson, Hartford, CT (US); Brian St. Rock, Andover, CT (US)

(73) Assignee: B/E Aerospace, Inc., Winston-Salem, NC (US)

( * ) Notice: Subject to any disclaimer, the term of this patent is extended or adjusted under 35 U.S.C. 154(b) by 219 days.

(21) Appl. No.: 17/095,676

(22) Filed: Nov. 11, 2020

(65) Prior Publication Data

US 2022/0146213 A1 May 12, 2022

(51) Int. Cl.
| | | |
|---|---|---|
| *F28F 1/12* | (2006.01) | |
| *F25B 13/00* | (2006.01) | |
| *F25B 39/02* | (2006.01) | |

(52) U.S. Cl.
CPC ............... *F28F 1/12* (2013.01); *F25B 13/00* (2013.01); *F25B 39/02* (2013.01)

(58) Field of Classification Search
CPC .............. F28F 1/12; F25B 13/00; F25B 39/02
USPC .......................................................... 62/498
See application file for complete search history.

(56) References Cited

U.S. PATENT DOCUMENTS

| | | | |
|---|---|---|---|
| 3,025,684 A | 3/1962 | McLain et al. | |
| 3,668,887 A * | 6/1972 | Riello ..................... | F24F 1/037 415/121.2 |
| 6,019,165 A * | 2/2000 | Batchelder ............ | H01L 23/427 165/80.4 |
| 6,138,466 A * | 10/2000 | Lake ................... | B60H 1/00392 62/238.7 |
| 6,244,331 B1 | 6/2001 | Budelman | |
| 6,945,315 B1 | 9/2005 | Gektin et al. | |
| 8,988,881 B2 * | 3/2015 | Koplow ................ | F04D 25/066 165/122 |
| 9,103,599 B2 | 8/2015 | Lee et al. | |
| 10,103,089 B2 | 10/2018 | Kaslusky et al. | |
| 10,533,810 B2 | 1/2020 | Lynn et al. | |
| 2005/0274134 A1 | 12/2005 | Ryu et al. | |
| 2010/0038056 A1 | 2/2010 | Ellsworth et al. | |

(Continued)

FOREIGN PATENT DOCUMENTS

DE 102014018703 A1 6/2016

OTHER PUBLICATIONS

Extended European Search Report, of the European Patent Office, dated May 6, 2017, in corresponding European Patent Application No. 21207754.9.

*Primary Examiner* — Claire E Rojohn, III
(74) *Attorney, Agent, or Firm* — Locke Lord LLP; Daniel J. Fiorello; Gabriella D'Angelo (57) ABSTRACT

A heat transfer system (e.g., a heat pump) can include at least a first fin array and at least a first pump disposed in fluid communication with the first fin array and configured to cause a first fluid to flow through the first fin array. The system can include at least a first heat transfer layer attached to and/or in thermal communication with the first fin array. The first heat transfer layer can define a second fluid flow path therein for a second fluid to flow fluidly isolated from the first fluid. The first heat transfer layer and the first fin array can be configured to cause heat transfer between the first fluid and the second fluid.

18 Claims, 6 Drawing Sheets

(56) References Cited

U.S. PATENT DOCUMENTS

2010/0107667 A1\* 5/2010 Petrenko ................. F25D 21/08
  62/515
2015/0330718 A1   11/2015 St. Rock et al.
2018/0320938 A1\* 11/2018 Otey ........................ F25B 21/02
2019/0274233 A1\*  9/2019 Lee .......................... G06F 1/20

\* cited by examiner

HEAT TRANSFER SYSTEMS

FIELD

This disclosure relates to heat transfer systems, e.g., heat pumps.

BACKGROUND

Traditional vapor compression refrigeration cycles consist of separate evaporator and condenser heat exchangers with fin and/or tube configurations. An external fan is often required to enhance heat transfer on the external side of the heat exchangers. Two-phase heat exchangers exploit the latent heat of vaporization and high heat transfer coefficients to effectively transfer heat to/from a refrigerant to the primary fluid (e.g., air). In the case of an evaporator, the primary fluid is cooled by rejecting heat to the refrigerant. In the case of condenser, the waste heat from the refrigerant is rejected to a secondary fluid. Evaporators and condensers traditionally take the form of tube and/or finned geometry with an external fan.

Such conventional methods and systems have generally been considered satisfactory for their intended purpose. However, there is still a need in the art for improved heat transfer systems. The present disclosure provides a solution for this need.

SUMMARY

A heat transfer system (e.g., a heat pump) can include at least a first fin array and at least a first pump disposed in fluid communication with the first fin array and configured to cause a first fluid to flow through the first fin array. The system can include at least a first heat transfer layer attached to and/or in thermal communication with the first fin array. The first heat transfer layer can define a second fluid flow path therein for a second fluid to flow fluidly isolated from the first fluid. The first heat transfer layer and the first fin array can be configured to cause heat transfer between the first fluid and the second fluid.

For example, the first fluid can be air and the second fluid is refrigerant. Any other suitable fluids (e.g., air and non-refrigerant coolant) are contemplated herein.

In certain embodiments, the first fin array can be disk shaped and defines a central hole (e.g., to form a toroidal shape). Any other suitable shape (e.g., a square or other polygonal plate shape) is contemplated herein.

The first pump can be a centrifugal pump disposed in the central hole and configured to cause the first fluid to flow through the first fin array. Any other suitable pump arrangement is contemplated herein.

In certain embodiments, the first pump can include an inlet and an outlet. The inlet can be configured to receive the first fluid from the atmosphere and the outlet can be configured to eject the first fluid into the first fin array. Any other suitable fluid connection and/or pumping direction (e.g., reverse where the pump pulls flow through the fin array) is contemplated herein.

In certain embodiments, the first heat transfer layer can be disk shaped and can define a plate hole therethrough that aligns with the central hole of the first fin array (e.g., to form a toroidal shaped plate). Any other suitable shape for the heat transfer layer (e.g., conformal with the planform shape of the fin array) is contemplated herein.

The second fluid flow path can be a serpentine path that wraps circumferentially back and forth around a central axis of the first heat transfer layer from the inner radius to the outer radius. Any other suitable flow path is contemplated herein.

In certain embodiments, the second fluid flow path can include a path inlet and a path outlet at a radial edge of the disk shape. The path inlet and path outlet can be adjacent each other.

In certain embodiments, a motor of the first pump can be disposed through the plate hole of the first heat transfer layer. Any other suitable motor arrangement is contemplated herein.

In certain embodiments, a separator layer can be attached on a first side to the first heat transfer layer to thermally isolate the first heat transfer layer from a second side of the separator layer. The separator layer can be made of any suitable thermally insulating material, for example.

The system can include a second heat transfer layer that can be disposed on the second side of the separator layer thermally insulated from the first heat transfer layer. The second heat transfer layer can define a third fluid flow path therein for the second fluid to flow fluidly isolated from at least a third fluid and/or the first fluid.

The system can include a second fin array attached to and/or in thermal communication with the second heat transfer layer. The second heat transfer layer and the second fin array can be configured to cause heat transfer between the second fluid and the third fluid and/or the first fluid.

In certain embodiments, the first fluid can be interior air, the second fluid can be a refrigerant, and the third fluid can be exterior air. The system can further include a second pump configured to cause the third fluid to flow through the second fin array.

The second fin array can be disk shaped and can define a second central hole (e.g., to define a toroidal shape). The second heat transfer layer can be disk shaped and can define a second plate hole therethrough that aligns with the central hole of the second fin array (e.g., to define a toroidal shape). Any suitable shape (e.g., similar shape but different size relative to the first fin array and the first heat transfer layer) is contemplated herein.

In certain embodiments, the second pump can be a centrifugal pump disposed in the second central hole and configured to cause the third fluid to flow through the second fin array. The second pump can include an inlet and an outlet. The inlet can be configured to receive the third fluid from the atmosphere and the outlet can be configured to eject the third fluid into the second fin array. Any other suitable arrangement and/or pump direction is contemplated herein.

In certain embodiments, the first pump and the second pump can share a common motor that extends through both heat transfer layers and the separator layer. In certain embodiments, the first heat transfer layer can include a smaller diameter than the second heat transfer layer such that the first side of the separator layer extends radially beyond the first heat transfer layer. The system can include one or more refrigeration system components and/or electronics disposed on the separator layer on the first side of the separator layer radially beyond the first heat transfer layer.

In certain embodiments, the system can include a compressor and an expansion valve. For example, the first heat transfer layer can be an evaporator, and the second heat transfer layer can be a condenser of a refrigeration cycle. The compressor can be configured receive second fluid from the first heat transfer layer and to compress the second fluid upstream of an inlet the second heat transfer layer. The expansion valve can be configured to receive second fluid from the second heat transfer layer and to cause expansion and cooling of the second fluid upstream of an inlet of the first heat transfer layer. Any other suitable arrangement and/or use of any suitable embodiment is contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
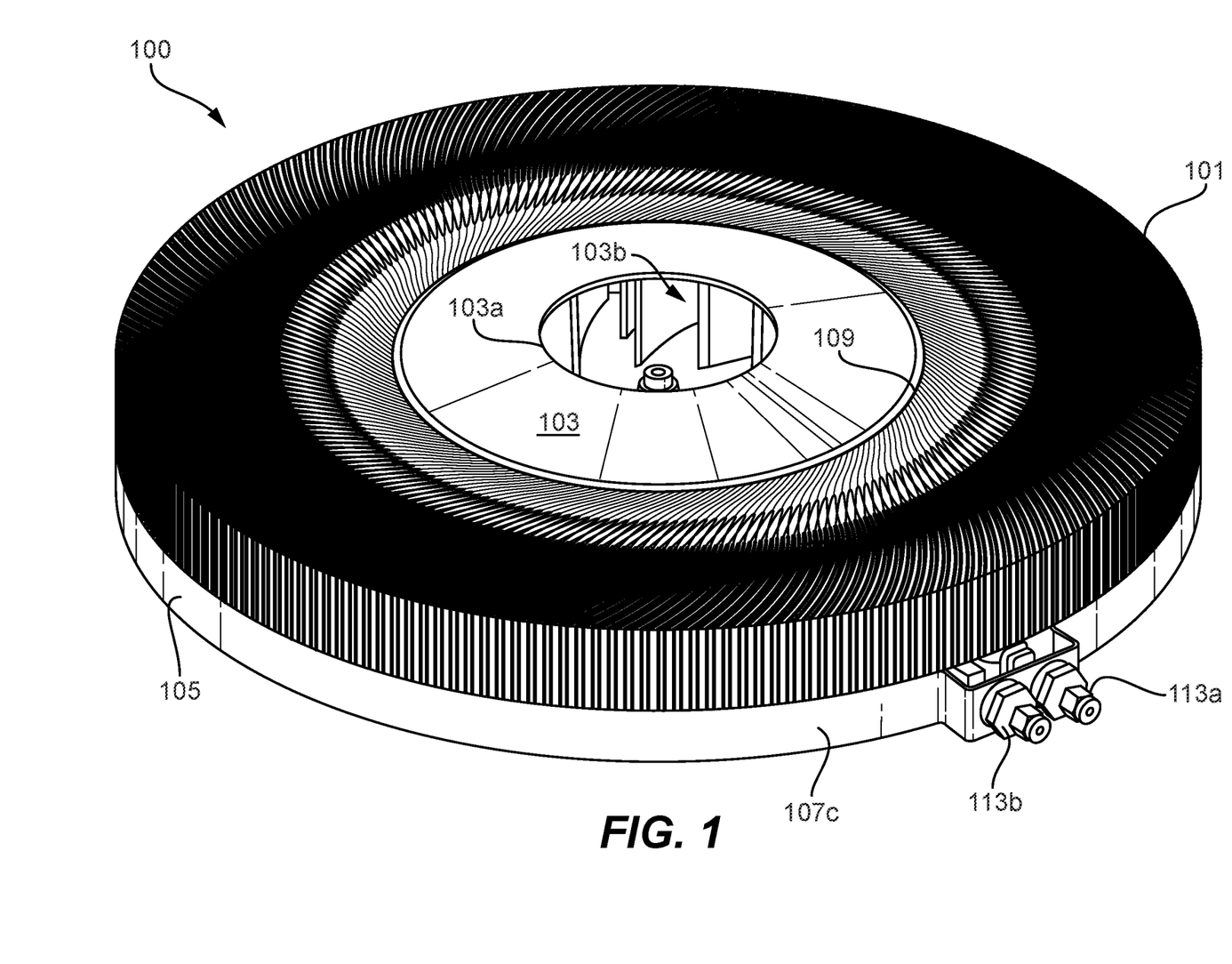
FIG. 1 is a perspective view of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-6. Certain embodiments described herein can be used in or as a heat pump system (e.g., refrigeration and/or heating).

Referring to FIGS. 1-4, a heat transfer system 100 (e.g., a heat pump or portion thereof) can include at least a first fin array 101 and at least a first pump 103 disposed in fluid communication with the first fin array 101. The first pump 103 can be configured to cause a first fluid (e.g., air) to flow through the first fin array 101.

Figure 2:
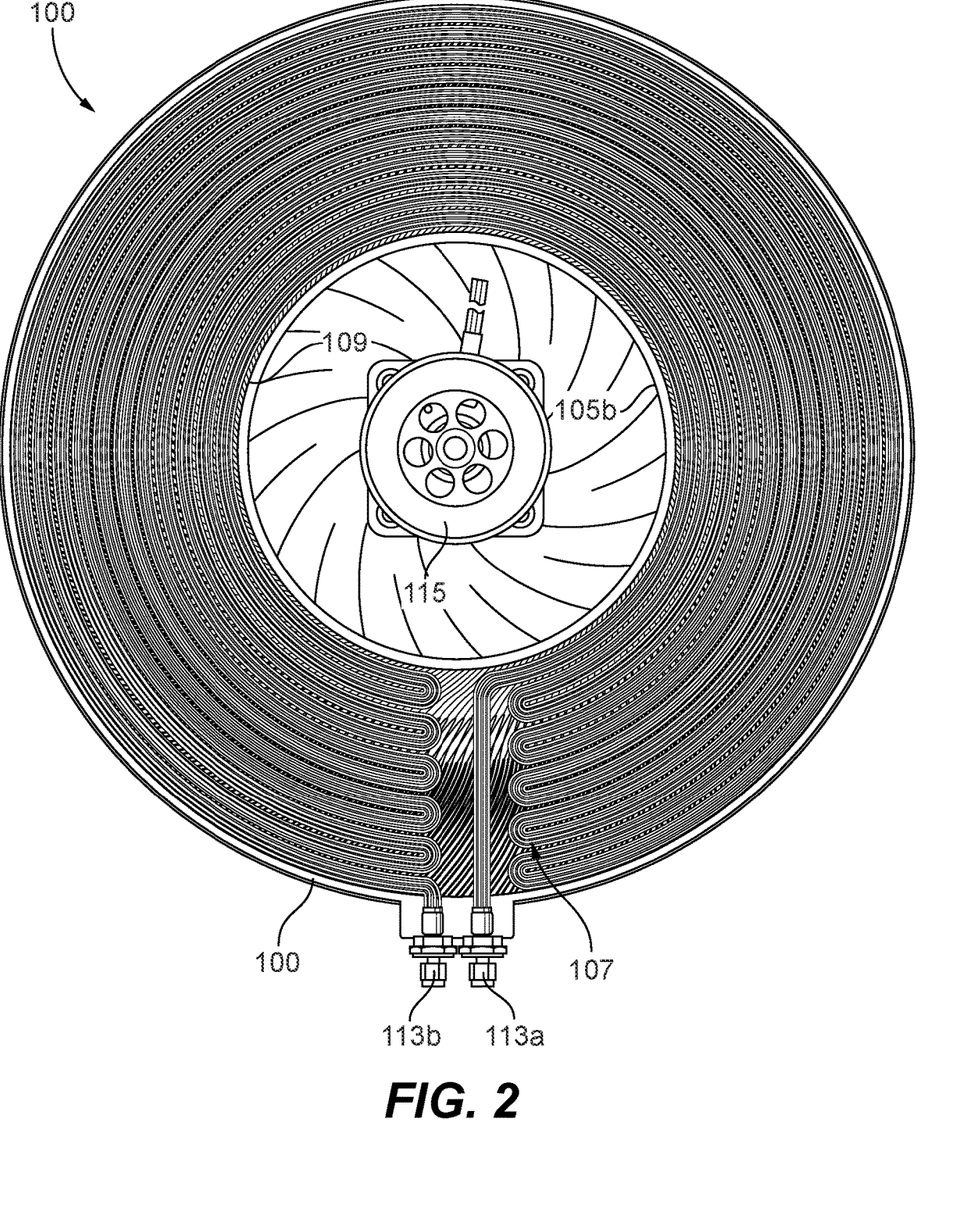
FIG. 2 is a cross-sectional plan view of the embodiment of FIG. 1, showing an embodiment of a second fluid flow path.
Figure 3:
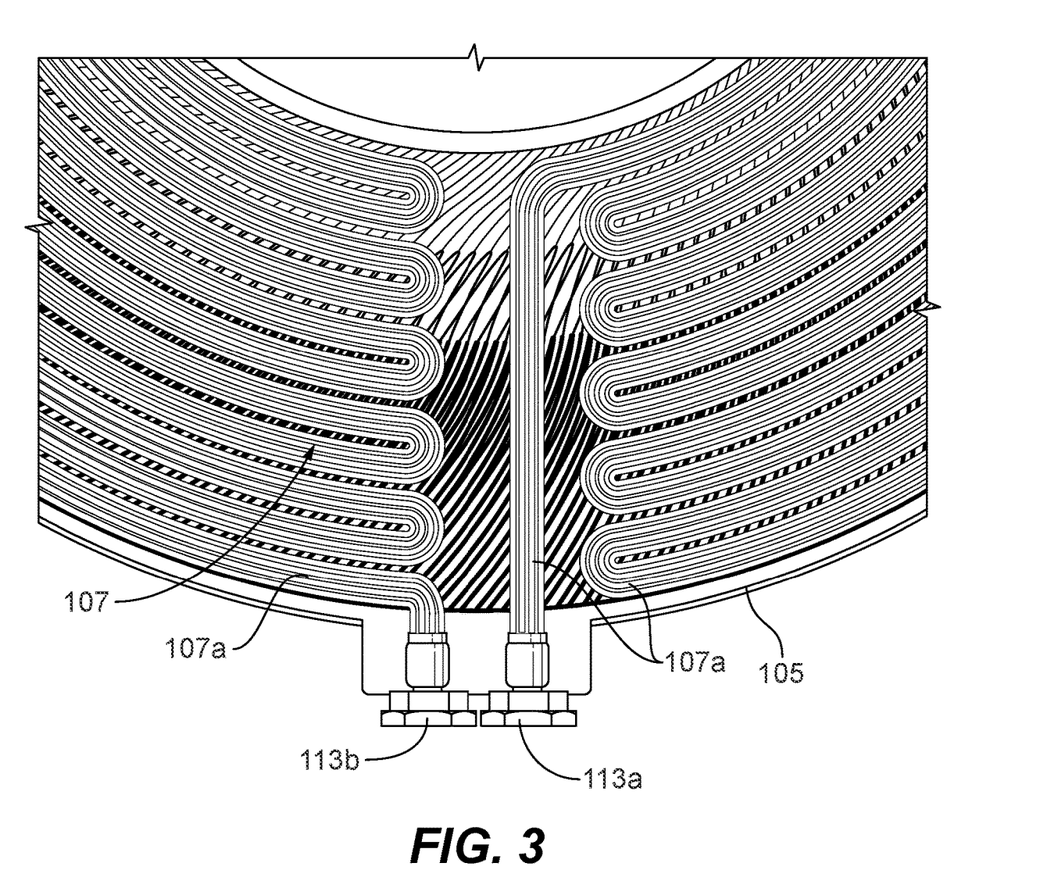
FIG. 3 is a close up view of a portion of the embodiment shown in FIG. 2.
Figure 4:
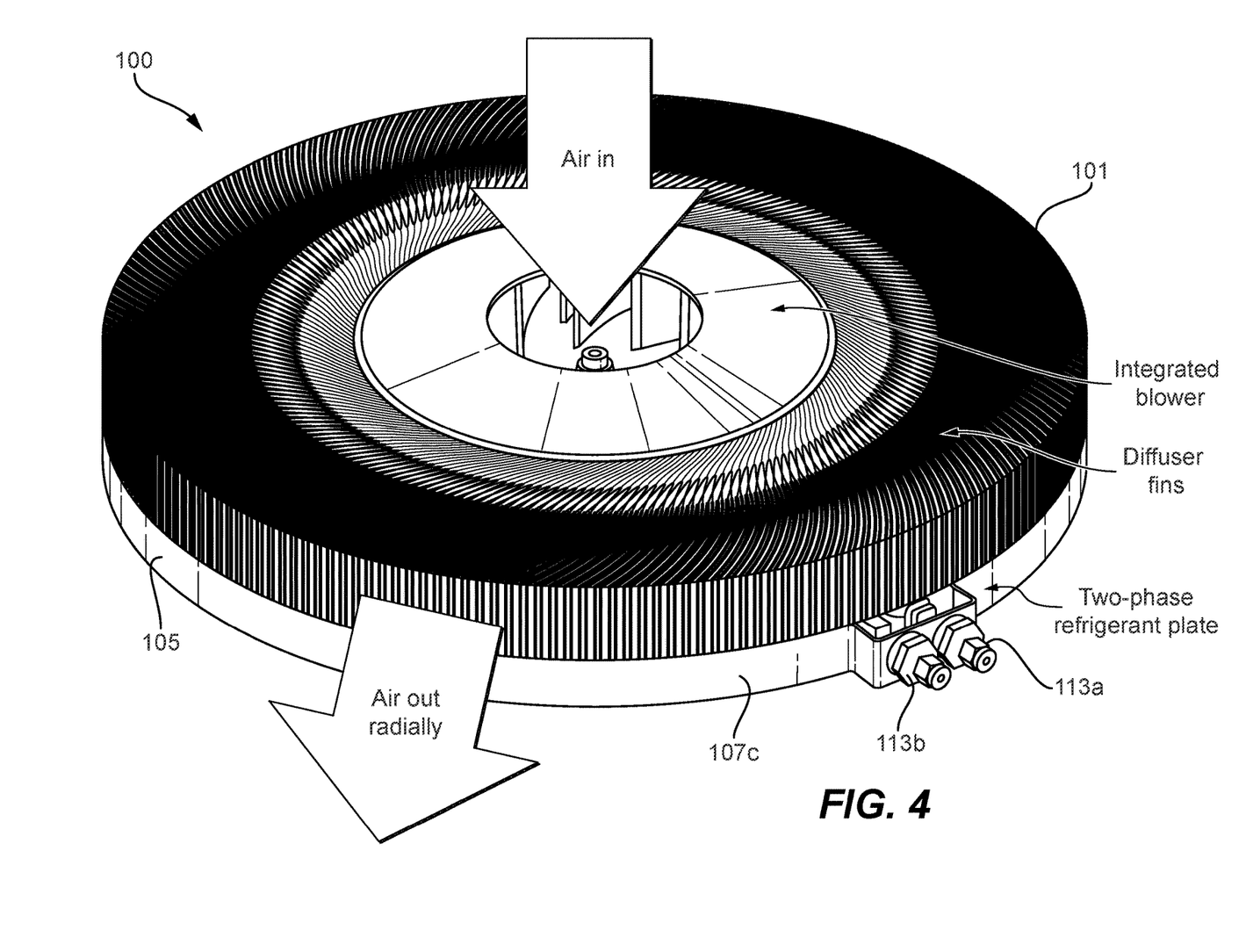
FIG. 4 is a perspective view of the embodiment of FIG. 1, shown pumping a first fluid in an embodiment of a pump direction.

The system 100 can include at least a first heat transfer layer 105 attached to (e.g., integrally or otherwise connected to) and/or in thermal communication with the first fin array 101. As shown in FIGS. 2 and 3, the first heat transfer layer 105 can define a second fluid flow path 107 therein for a second fluid (e.g., refrigerant or coolant) to flow fluidly isolated from the first fluid (e.g., air). The first heat transfer layer 105 and the first fin array 101 can be configured to cause heat transfer between the first fluid (e.g., air) and the second fluid (e.g., refrigerant). In certain embodiments, the first fin array 101 and/or first heat transfer layer 105 can be made of metal, and can be separate components attached to each other (e.g., via brazing), positioned together with any suitable retainer (e.g., clamps or screws), or can be integrally formed together (e.g., via layerwise additive manufacturing).

For example, the first fluid can be air and the second fluid is refrigerant. Any other suitable fluids (e.g., air and non-refrigerant coolant) are contemplated herein.

In certain embodiments, e.g., as shown, the first fin array 101 can be substantially disk shaped and/or define a central hole 109 (e.g., to form a toroidal shape). Any other suitable shape (e.g., a square or other polygonal plate shape) is contemplated herein. The first fin array 101 can have any suitable vertical dimensions (e.g., a constant vertical height or variable vertical height) and/or have any suitable fin shape and/or arrangement (e.g., to maximize thermal transfer with a radial air flow through the fins). For example, the inner diameter can include a lower density of fins closer to the outlet of the first pump 103 and increase in density radially outwardly.

The first pump 103 can be a centrifugal pump (e.g., as shown) disposed in the central hole 109 and configured to cause the first fluid to flow through the first fin array 101. Any other suitable pump arrangement is contemplated herein.

In certain embodiments, the first pump 105 can include an inlet 103a and an outlet 103b. The inlet 103a can be configured to receive the first fluid (e.g., air) from the atmosphere and the outlet 103b can be configured to eject the first fluid into the first fin array 101. Any other suitable fluid connection and/or pumping direction (e.g., reverse where the pump pulls flow through the fin array) is contemplated herein.

Figure 5:
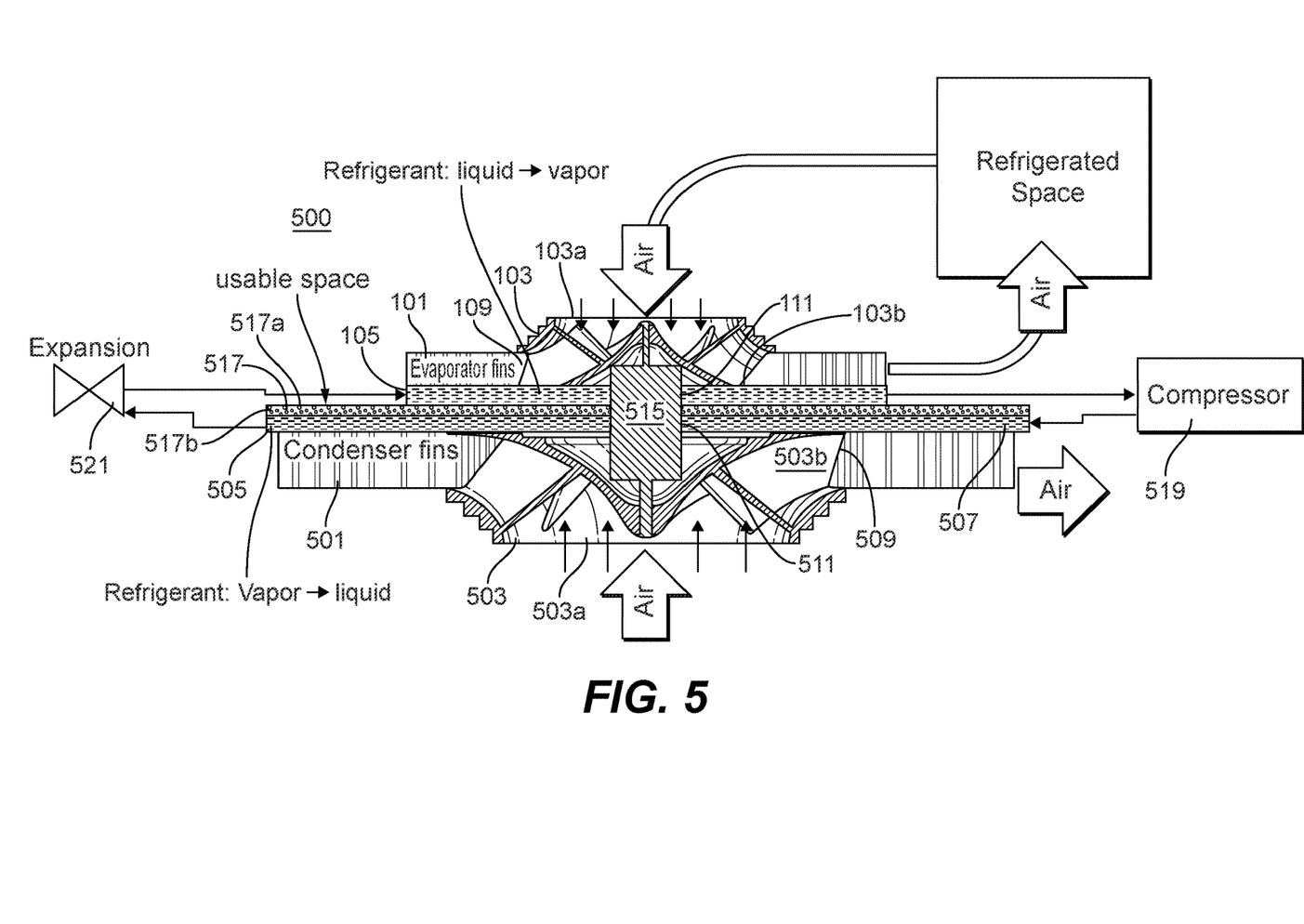
FIG. 5 is a cross-sectional side view of a further embodiment of a system in accordance with this disclosure.

In certain embodiments, the first heat transfer layer 105 can be disk shaped and can define a plate hole 111 (e.g., as shown in FIG. 5) therethrough that aligns with the central hole 109 of the first fin array 101 (e.g., to form a toroidal shaped plate such as a washer). Any other suitable shape for the heat transfer layer 105 (e.g., conformal with the planform shape of the fin array 101, or otherwise relatively shaped to the fin array 101) is contemplated herein.

As shown in FIGS. 2 and 3, the second fluid flow path 107 can be a serpentine path that wraps circumferentially back and forth around a central axis (e.g., around the center hole 111) of the first heat transfer layer 105 from the inner radius to the outer radius. Any other suitable flow path is contemplated herein. As shown, the second fluid flow path 107 can include one or more channels 107a (e.g., a plurality of parallel channels 107a) that form the serpentine path or any other suitable path (e.g., to maximize surface area in contact with channels 107a, and/or to maximize residence time of the second fluid within the layer 105).

In certain embodiments, the second fluid flow path 107 can include a path inlet 113a and a path outlet 113b at a radial edge 107c of the disk shape. The path inlet 113a and path outlet 113a can be adjacent each other, e.g. as shown. Any other suitable position is contemplated herein.

In certain embodiments, a motor 115 of the first pump 103 can be disposed through the plate hole 109 of the first heat transfer layer 105, and/or the fin array 101, e.g., as shown. Any other suitable motor arrangement is contemplated herein.

Figure 6:
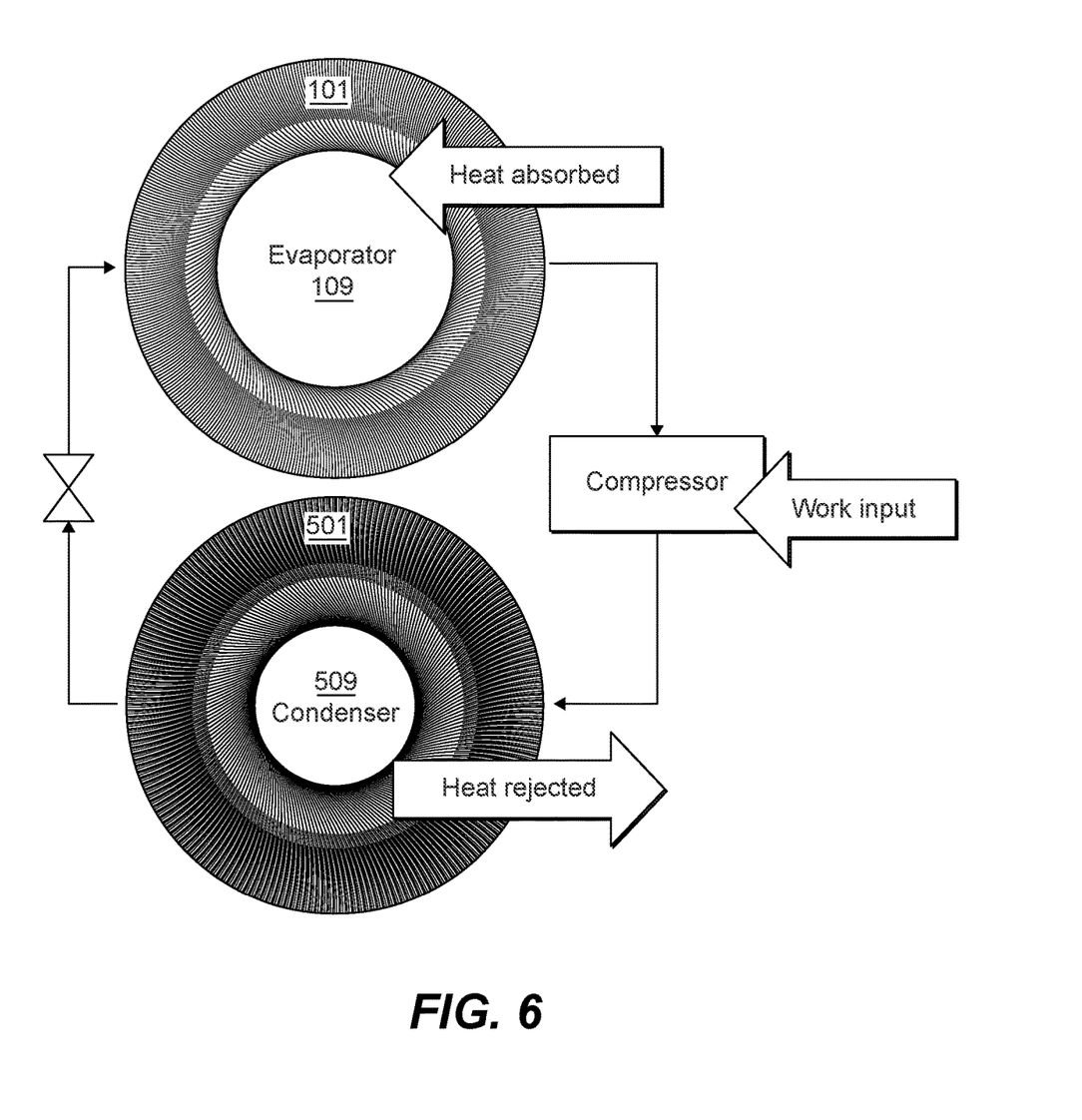
FIG. 6 is a schematic system diagram of an embodiment of a refrigerant cycle in accordance with this disclosure.

Referring additionally to FIGS. 5 and 6, in certain embodiments, a separator layer 517 can be attached on a first side 517a to the first heat transfer layer 105 to thermally isolate the first heat transfer layer 105 from a second side 517b of the separator layer 517. The separator layer 517 can be made of any suitable thermally insulating material (e.g., ceramic, polymer, etc.), for example.

As shown in FIG. 5, the system 500 can include a second heat transfer layer 505 that can be disposed on the second side 517b of the separator layer thermally insulated from the first heat transfer layer 105. The second heat transfer layer 505 can define a third fluid flow path 507 therein for the second fluid (e.g., refrigerant in a closed loop) to flow fluidly isolated from at least a third fluid (e.g., outside air) and/or the first fluid (e.g., inside air).

The system 505 can include a second fin array 501 attached to and/or in thermal communication with the second heat transfer layer 505. The second heat transfer layer 505 and the second fin array 501 can be configured to cause heat transfer between the second fluid (e.g., refrigerant) and the third fluid (e.g., outside air) and/or the first fluid (e.g., in a different location or in any suitable relative position to the first fin array 101).

In certain embodiments, e.g., in a refrigeration setting, the first fluid can be interior air, the second fluid can be a refrigerant, and the third fluid can be exterior air. The system 500 can further include a second pump 503 configured to cause the third fluid to flow through the second fin array 501.

The second fin array 501 can be similar to the first fin array 101 (e.g., but of a larger size as shown). For example, the second fin array 501 can be disk shaped and can define a second central hole 509 (e.g., to define a toroidal shape).

The second heat transfer layer 505 can be similar to the first heat transfer layer 105 (e.g., but of a different size to conform to the size and shape of the second fin array 501). For example, the second heat transfer layer 505 can be disk shaped and can define a second plate hole 511 therethrough that aligns with the central hole 509 of the second fin array 501 (e.g., to define a toroidal shape). Any suitable shape (e.g., similar shape but different size relative to the first fin array 101 and the first heat transfer layer) is contemplated herein.

The second pump 503 can be similar to the first pump 103 (e.g., but of a different, e.g., larger size). For example, in certain embodiments, the second pump 503 can be a centrifugal pump disposed in the second central hole 511 and configured to cause the third fluid to flow through the second fin array 501. The second pump 503 can include an inlet 503*a* and an outlet 503*b*. The inlet 503*a* can be configured to receive the third fluid from the atmosphere (e.g., outside air) and the outlet 503*b* can be configured to eject the third fluid into the second fin array 501. Any other suitable arrangement and/or pump direction (e.g., reverse) is contemplated herein.

In certain embodiments, the first pump 103 and the second pump 503 can share a common motor 515 that extends through both heat transfer layers 105, 505 and the separator layer 517. Any suitable motor arrangement is contemplated herein (e.g., a single motor connected to both pumps, a separate motor for each pump to independently control each pump, a gearing system connecting the pumps to have different fan speeds).

In certain embodiments, e.g., as shown, the first heat transfer layer 105 can include a smaller diameter than the second heat transfer layer 505 such that the first side 517*a* of the separator layer 517 extends radially beyond the first heat transfer layer 105. The system 500 can include one or more refrigeration system components (e.g., expansion valve) and/or electronics (e.g., controllers, switches, etc., disposed on the separator layer on the first side of the separator layer radially beyond the first heat transfer layer.

In certain embodiments, as shown in FIG. 5, the system 500 can include a compressor 519 and an expansion valve 521. In certain embodiments, the first heat transfer layer 105 can be an evaporator of a refrigeration cycle, and the second heat transfer layer 505 can be a condenser of a refrigeration cycle. The compressor 519 can be configured receive second fluid from the first heat transfer layer 105 and to compress the second fluid upstream of an inlet the second heat transfer layer 505, e.g., as shown. The expansion valve 521 can be configured to receive second fluid from the second heat transfer layer 505 and to cause expansion and cooling of the second fluid upstream of an inlet of the first heat transfer layer 105. Any other suitable arrangement and/or use of any suitable embodiment is contemplated herein. In such a system, referring additionally to FIG. 6, one half can be placed in fluid communication with a refrigerated space, and the other half can be placed in fluid communication (e.g., isolated from the refrigerated space) with an outside air. As a result, cooling of the refrigerated space can be effected. In reverse operation, heating of the space can occur. Any other suitable use is contemplated herein.

Embodiments can provide a low profile heat pump, e.g., for refrigeration applications (e.g., for refrigerating any suitable space, e.g., a galley on aircraft or general room air conditioning). Any suitable application is contemplated herein.

Certain embodiments can be an integrated blower diffuser-fin two-phase heat exchanger. Embodiments of an integrated system can include a micro-air cooled exchanger (MACE) heat sink with a two-phase refrigerant plate. The heat exchanger structure may be manufactured in one piece with additive manufacturing. Embodiments can include a refrigerant channel path that is circumferential with multiple passes around the heat transfer plate. Embodiments can include finned features or dividers inside of the channels. The heat exchanger may take a circular/elliptical shape (e.g., as shown), a square/rectangular shape, or any other suitable shape.

Embodiments can provide a more directed, and thus more efficient, air flow path, as opposed to an externally mounted fan. The diffusing nature of the heat sink fins can result in a fan-power savings. The pump (e.g., a blower or fan) can provide pressure head downstream of the MACE for additional use. The blower integration can also beneficial from a packaging perspective.

Embodiments can provide several benefits over traditional condenser/evaporator heat exchangers. For example, embodiments can provide a benefit in applications with height-constrained space requirements. Embodiments of circumferential channel paths can provide a method to route refrigerant through a circular plate in an efficient manner. The design may select the number of parallel channels and the total length of channels in order to directly manage the tradeoff between pressure drop and heat transfer along the fluid path. Various finned features can be employed inside the channels, e.g., straight fins, wavy fins, pin fins, turbulator features, etc. Additive manufacturing can be utilized to allow for design flexibility that is not possible with traditional manufacturing.

Certain embodiments include a refrigeration cycle consisting of diffuser-fin heat exchangers. Embodiments can include a vapor compression cycle consisting of MACE (diffuser-fin) heat exchangers including back-to-back packaging. Each MACE heat sink can be integrated with a refrigerant plate and blower to form a heat exchanger. The two heat exchangers can be mounted together, using one motor to turn both blowers, for example. Each heat exchanger can feature an individual blower to circulate air to a refrigerated space (evaporator side) or ambient air (condenser side). The heat exchangers can be circular or rectangular in shape, for example, or any other suitable shape. Embodiments can be additively manufactured in one piece with multi-materials for the insulation layer between the two refrigerant plates. Alternatively, each heat exchanger could be additively manufactured together and then assembled into the back-to-back configuration.

In such systems, a shared dual-shaft motor can lower the total weight and power requirement compared with individual heat exchangers, for example. In certain embodiments, the compact size of the unit can allow ducting lengths to be minimized to/from the compressor and expansion valve. Because the condenser is fundamentally larger than the evaporator, a portion of usable space can be available for mounting electronics or other small components, for example. For example, an electronics PCB could be designed in a ring shape to fit into this space.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A heat transfer system, comprising:
   at least a first fin array;
   at least a first pump disposed in fluid communication with the first fin array and configured to cause a first fluid to flow through the first fin array; and
   at least a first heat transfer layer attached to and/or in thermal communication with the first fin array, the first heat transfer layer defining a second fluid flow path therein for a second fluid to flow fluidly isolated from the first fluid, wherein the first heat transfer layer and the first fin array are configured to cause heat transfer between the first fluid and the second fluid, wherein the first fin array is disk shaped and defines a central hole therethrough, wherein the first pump is a centrifugal pump disposed in the central hole configured to cause the first fluid to flow through the first fin array.

2. The system of claim 1, wherein the first fluid is air and the second fluid is refrigerant.

3. The system of claim 1, wherein first pump includes an inlet and an outlet, wherein the inlet is configured to receive the first fluid from the atmosphere and the outlet is configured to eject the first fluid into the first fin array.

4. The system of claim 1, wherein the first heat transfer layer is disk shaped and defines a plate hole therethrough that aligns with the central hole of the first fin array.

5. The system of claim 1, wherein the second fluid flow path is a serpentine path that wraps circumferentially back and forth around a central axis of the first heat transfer layer from an inner radius to an outer radius.

6. The system of claim 5, wherein the second fluid flow path includes a path inlet and a path outlet at a radial edge of the disk shape.

7. The system of claim 6, wherein the path inlet and path outlet are adjacent each other.

8. The system of claim 4, wherein a motor of the first pump extends through the plate hole of the first heat transfer layer.

9. The system of claim 1, further comprising a separator layer attached on a first side to the first heat transfer layer to thermally isolate the first heat transfer layer from a second side of the separator layer.

10. The system of claim 9, further comprising a second heat transfer layer disposed on the second side of the separator layer thermally insulated from the first heat transfer layer, the second heat transfer layer defining a third fluid flow path therein for the second fluid to flow fluidly isolated from at least a third fluid and/or the first fluid.

11. The system of claim 10, further comprising a second fin array attached to and/or in thermal communication with the second heat transfer layer, wherein the second heat transfer layer and the second fin array are configured to cause heat transfer between the second fluid and the third fluid and/or the first fluid.

12. The system of claim 11, wherein the first fluid is interior air, wherein the second fluid is refrigerant, and wherein the third fluid is exterior air.

13. The system of claim 11, further comprising a second pump configured to cause the third fluid to flow through the second fin array.

14. The system of claim 13, wherein the second fin array is disk shaped and defines a second central hole, wherein the second heat transfer layer is disk shaped and defines a second plate hole therethrough that aligns with the central hole of the second fin array.

15. The system of claim 14, wherein the second pump is a centrifugal pump disposed in the second central hole and configured to cause the third fluid to flow through the second fin array, wherein the second pump includes an inlet and an outlet, wherein the inlet is configured to receive the third fluid from the atmosphere and the outlet is configured to eject the third fluid into the second fin array.

16. The system of claim 15, wherein the first pump and the second pump share a common motor that extends through both heat transfer layers and the separator layer.

17. The system of claim 16, wherein the first heat transfer layer includes a smaller diameter than the second heat transfer layer such that the first side of the separator layer extends radially beyond the first heat transfer layer, further comprising one or more refrigeration system components and/or electronics disposed on the separator layer on the first side of the separator layer radially beyond the first heat transfer layer.

18. The system of claim 10, comprising a compressor and an expansion valve, wherein the first heat transfer layer is an evaporator, wherein the second heat transfer layer is a condenser, wherein the compressor is configured receive second fluid from the first heat transfer layer and to compress the second fluid upstream of an inlet the second heat transfer layer, wherein the expansion valve is configured to receive second fluid from the second heat transfer layer and to cause expansion and cooling of the second fluid upstream of an inlet of the first heat transfer layer.

* * * * *